INVENTORS
Sigmund M. Morey
BY Secondo L. Casella
J.B. Felshin
ATTORNEY

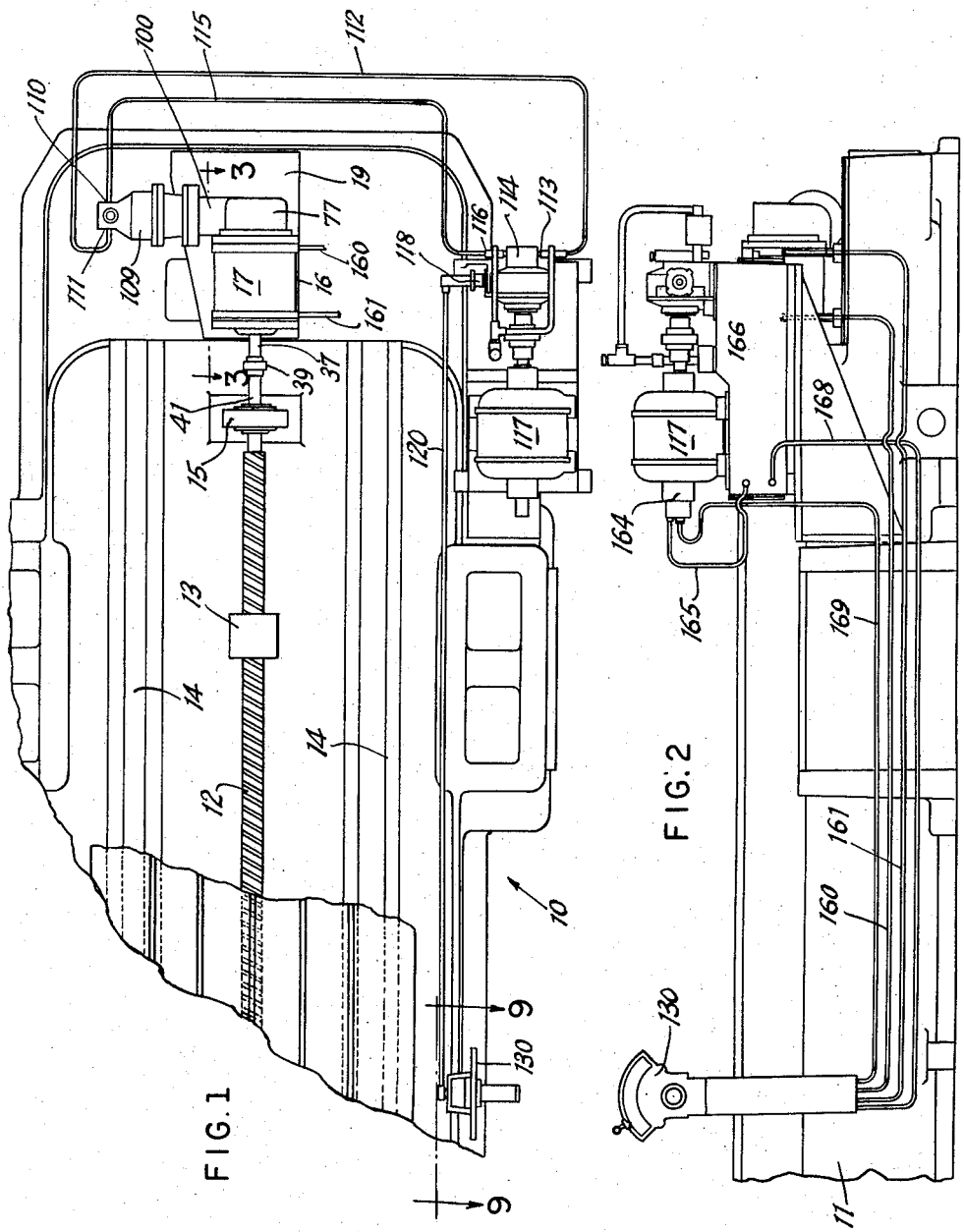

July 7, 1959　　　S. M. MOREY ET AL　　　2,893,269
MECHANISM FOR CONTROLLING MOVEMENT OF A MACHINE TOOL PART
Filed Feb. 10, 1955　　　　　　　　　　　　6 Sheets-Sheet 4

INVENTORS
*Sigmund M. Morey*
BY *Secondo L. Casella*
ATTORNEY

July 7, 1959 S. M. MOREY ET AL 2,893,269
MECHANISM FOR CONTROLLING MOVEMENT OF A MACHINE TOOL PART
Filed Feb. 10, 1955 6 Sheets-Sheet 5

INVENTORS
*Sigmund M. Morey*
BY *Secondo L. Casella*
ATTORNEY

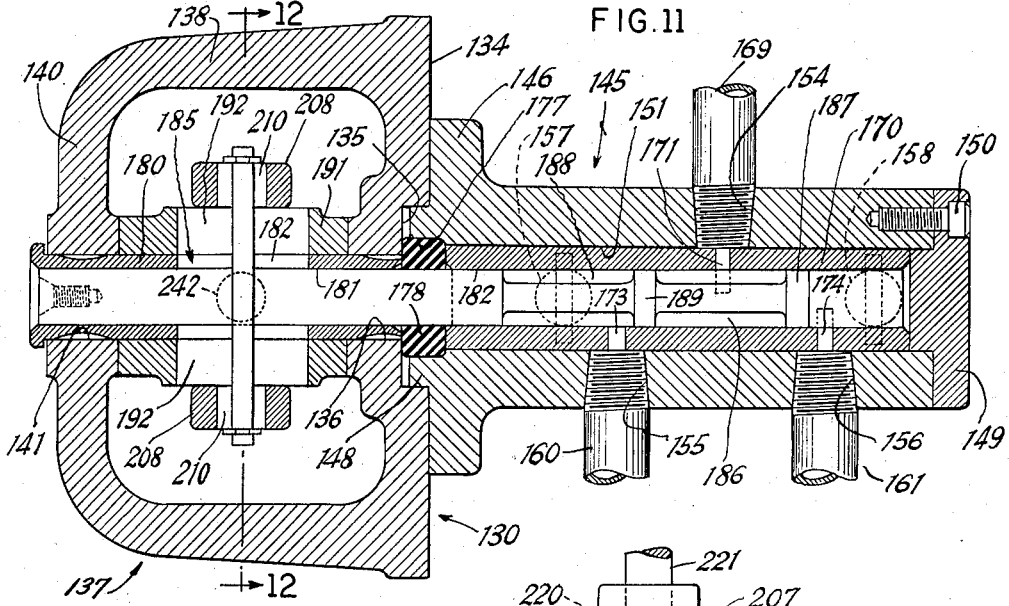
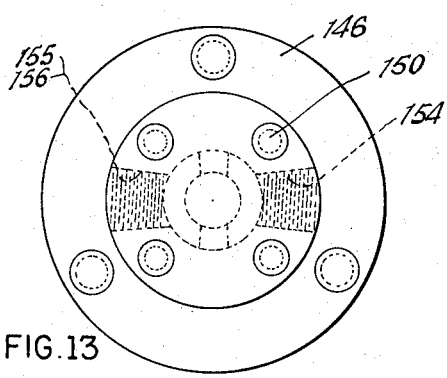
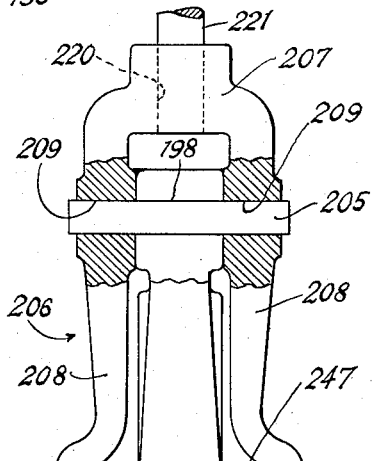
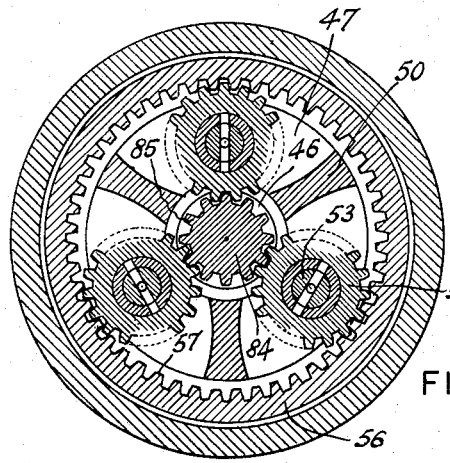
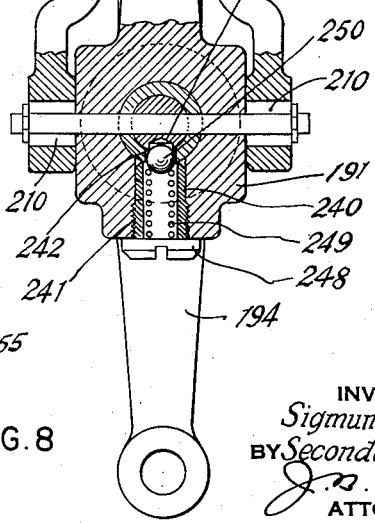

United States Patent Office 2,893,269
Patented July 7, 1959

2,893,269

MECHANISM FOR CONTROLLING MOVEMENT OF A MACHINE TOOL PART

Sigmund M. Morey and Secondo L. Casella, New York, N.Y., assignors to Morey Machinery Co., Inc., Astoria, N.Y., a corporation of New York Application February 10, 1955, Serial No. 487,367

10 Claims. (Cl. 74—785)

This invention relates to machine tools such as profile milling machines and the like machines. It is particularly directed to mechanism for controlling the speed of movement and direction of movement of a part of a machine tool, such as the table or bed of a profile milling machine.

One object of this invention is to provide in a machine of the character described, control mechanism, including a single handle and means dependent upon the movement of the handle for moving the table forwardly in high speed range, in reverse at high speed range, forwardly in low speed range, in reverse direction at low speed and in idle condition so that it can be moved by operating some part of the machine by hand.

Another object of this invention is to provide a strong and durable mechanism of the character described, which shall be relatively inexpensive to manufacture, easy to manipulate, which shall be sure and positive in operation and yet practical and efficient to a high degree of use.

Other objects of this invention will in part be obvious and in part hereinafter pointed out.

The invention, accordingly, consists in the features of construction, combinations of elements, and arrangement of parts which will be exemplified in the construction hereinafter described and of which the scope of invention will be indicated in the appended claims.

In the accompanying drawings in which is shown various illustrative embodiments of this invention:

Fig. 1 is a top plan view of a machine tool such as a profile milling machine provided with control mechanism for the table, and embodying the invention;

Fig. 2 is a front elevation of the structure shown in Fig. 1;

Fig. 8 is a cross sectional view taken on line 8—8 of Fig. 4;

Fig. 11 is a cross sectional view taken on line 11—11 of Fig. 10;

Fig. 12 is a cross sectional view taken on line 12—12 of Fig. 11; and

Fig. 13 is an end view of the valve housing shown in Fig. 11.

Figure 3:
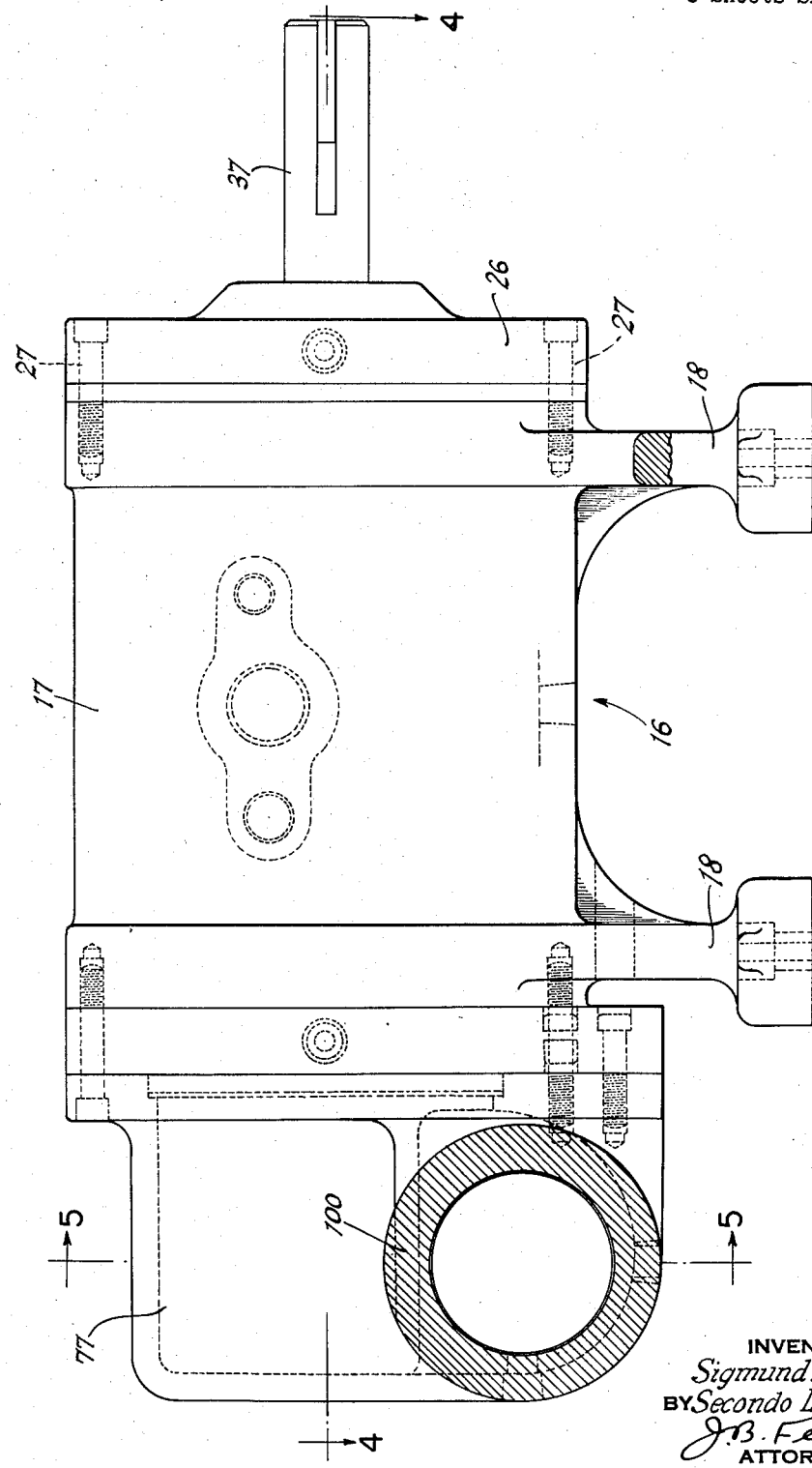
Fig. 3 is a cross sectional view taken on line 3—3 of Fig. 1.

Referring now in detail to the drawings, 10 designates a machine tool embodying the invention, here shown in a form of a profile milling machine. The same comprises a frame 11 on which is rotatably mounted a horizontally elongated screw 12. Engaged with the screw 12 is a travelling nut 13 which may be fixed to a table, not shown, sliding on guides 14 so that as the screw 12 turns in one direction, the nut and hence the table, slide in one direction and when the screw turns in an opposite direction, said nut, and hence the table, slide in an opposite direction. The screw 12, may be supported in suitable bearings 15.

Figure 4:
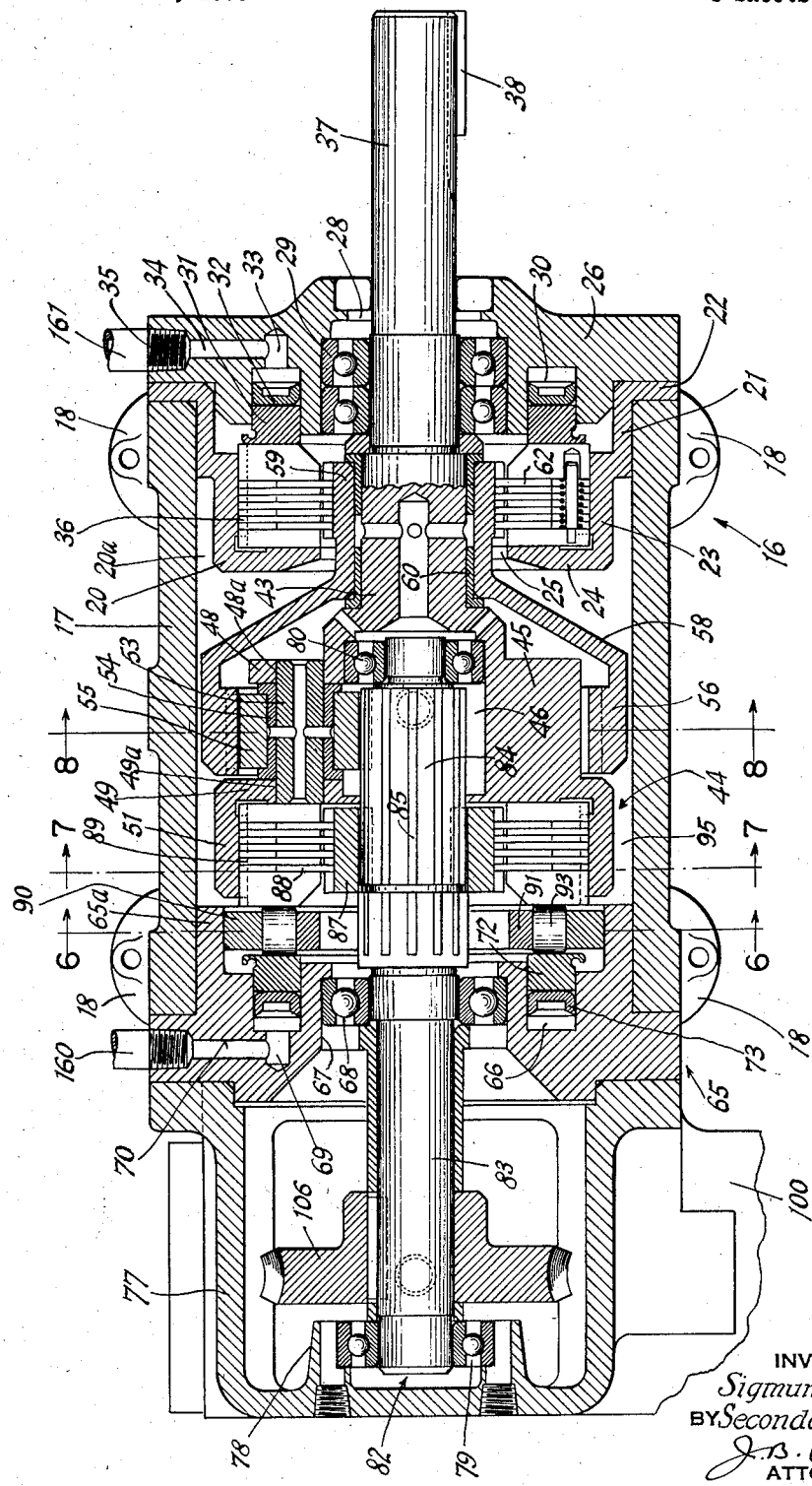
Fig. 4 is a cross sectional view taken on line 4—4 of Fig. 3.
Figure 5:
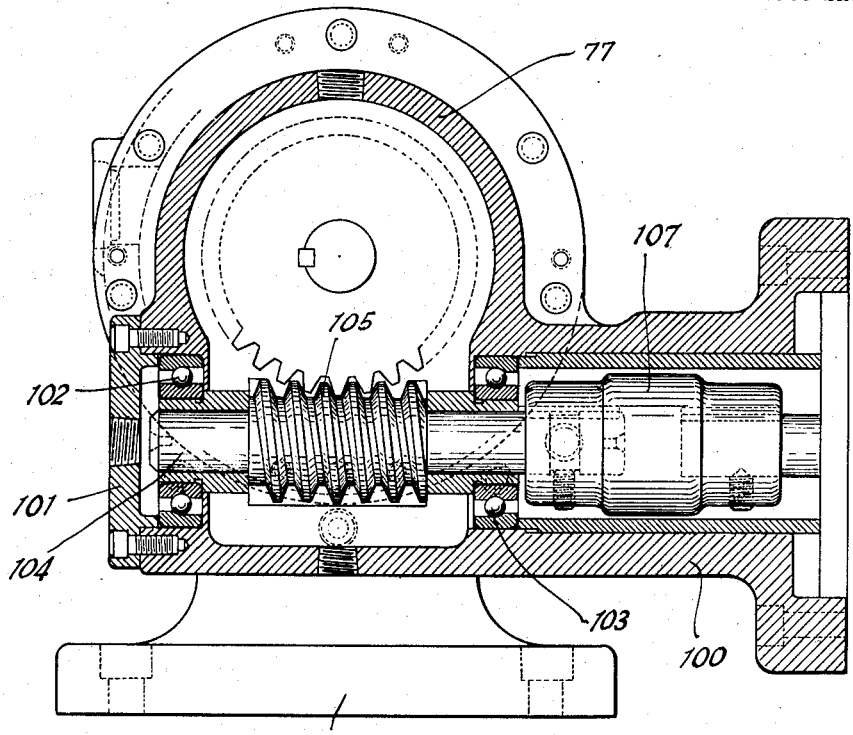
Fig. 5 is a cross sectional view taken on line 5—5 of Fig. 3.

Mounted on the frame 11 in any suitable manner is a planetary feed box 16 (see Figs. 1, 3, 4 and 5). The feed box 16 comprises a cylindrical housing 17 supported on legs 18 which may be fixed to a platform 19 on the frame, coaxially with the screw 12. Fixed to one end of the casing 17 is a brake cup 20, forming part of a clutch 20a. Said cup 20 is formed with a cylindrical flange 21 contacting the inner surface of the casing 17 (Fig. 4). Extending from the cylindrical wall 21 is an annular flange 22 engaging one end of casing 17. Extending from said cylindrical wall 21 to an opposite side thereof, is a reduced cylindrical wall 23 from which extends an annular flange 24 formed with a central opening 25.

Closing one end of the cylindrical casing 17 is an end wall 26 contacting flange 22 and fixed thereto and to the casing 17 by screws 27 (Fig. 3). The end wall 26 is formed with a central through opening 28 and supports an axial ball-bearing assembly 29. The end wall 26 is formed at its inner side with an annular groove 30. Slidably within the groove 30 is an annular or ring piston 31 engaging an annular piston cup 32. Extending from the groove 30 is a longitudinal passage 33, from which extends a radial passage 34 communicating with a pipe-threaded opening 35 for the purpose hereinafter appearing. Keyed to the cylindrical wall 23 are brake discs 36.

Supported for rotation within the bearing assembly 29 is an axial output shaft 37 provided with a key 38 engaging a coupling member 39 (Fig. 1) which couples said output shaft to one end 41 of the screw 12. Said output shaft 37 is provided with a shaft portion 43 passing axially through the clutch cup 20 and through the central opening 25 in flange 24. Extending from the shaft portion 43 is a planet carrier 44 comprising a hub 45 (Figs. 4 and 8) formed with an axial cavity 46. Said hub portion 45 is formed with three equi-angularly spaced notches 47 communicating with the central cavity 46. At each notch 47 there is provided a pair of opposed walls 48 and 49. Between each pair of adjacent notches 47 is a web 50. Each pair of opposed walls 48, 49 is formed with horizontally aligned through openings 48a and 49a, respectively. Extending from the hub 45 is a second cylindrical cup 51. Supported in each pair of aligned openings 48a, 49a is a transverse shaft 53 transversing the space between the opposed walls 48, 49. On each shaft 53 is a bushing 54. Rotatably mounted on each bushing 54 is a pinion 55. Surrounding the pinions 55 is a ring gear 56 having internal gear teeth 57 meshing with the pinions 55. Extending to one side of the ring gear 56 is a conical wall 58 from which extends a sleeve 59 surrounding the shaft portion 43 and passing through the opening 25 into the clutch cup 20. A bushing 60 may be interposed between sleeve 59 and shaft portion 43. Keyed to the sleeve 59 are brake discs 62 alternating with the brake discs 36 which are keyed to the clutch cup. It will now be understood that when a liquid medium is pumped into passage 34, in the manner hereinafter appearing, said medium will pass through passage 33 to groove 30, and will move the ring piston 31 to the left for pressing the brake discs 36, 62 into tight frictional contact for braking rotation of the ring gear 56.

Fixed to the opposite end of casing 17 is an end wall 65 formed at its inner surface with an annular groove 66. End wall 65 is formed with a central through opening 67 supporting a ball-bearing 68. Said end wall is formed with a passage 69 communicating with the groove 66. It is also formed with a radial passage 70 communicating with passage 69 and extending to a pipe-threaded opening 71 at the periphery of the end wall 65. Within the groove 66 is a ring piston 72 backed up by a piston cup 73. Fixed to the end wall 65 is a hollow cover 77 formed at one end with a bearing hub 78 co-axial with the through opening 67. Within the hub 78 is a ball-bearing 79. Within the cavity 46 of the planet carrier is another ball-bearing 80. It will be noted that the bearings 68, 79 and 80 are co-axial. Supported thereby is an input shaft 82 having portions journalled within the bearings 68, 79 and 80. Between the bearings 68, 79 and 80 is a shaft portion 83 of said shaft 82. Between the bearings 68 and 80 is a shaft portion 84 of said shaft 82, which is formed with longitudinal external gear teeth 85 meshing with the pinions 55. The sun gear teeth 85 serve as keys or splines for supporting a sleeve 87 on the shaft portion 84 and within the clutch cup 51.

Figure 6:
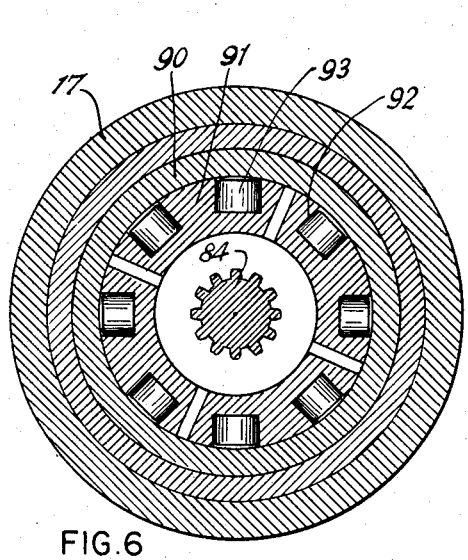
Fig. 6 is a cross sectional view taken on line 6—6 of Fig. 3.
Figure 7:
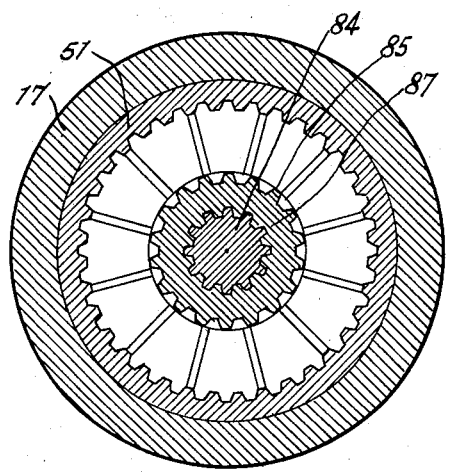
Fig. 7 is a cross sectional view taken on line 7—7 of Fig. 4.
Figures 9, 10:
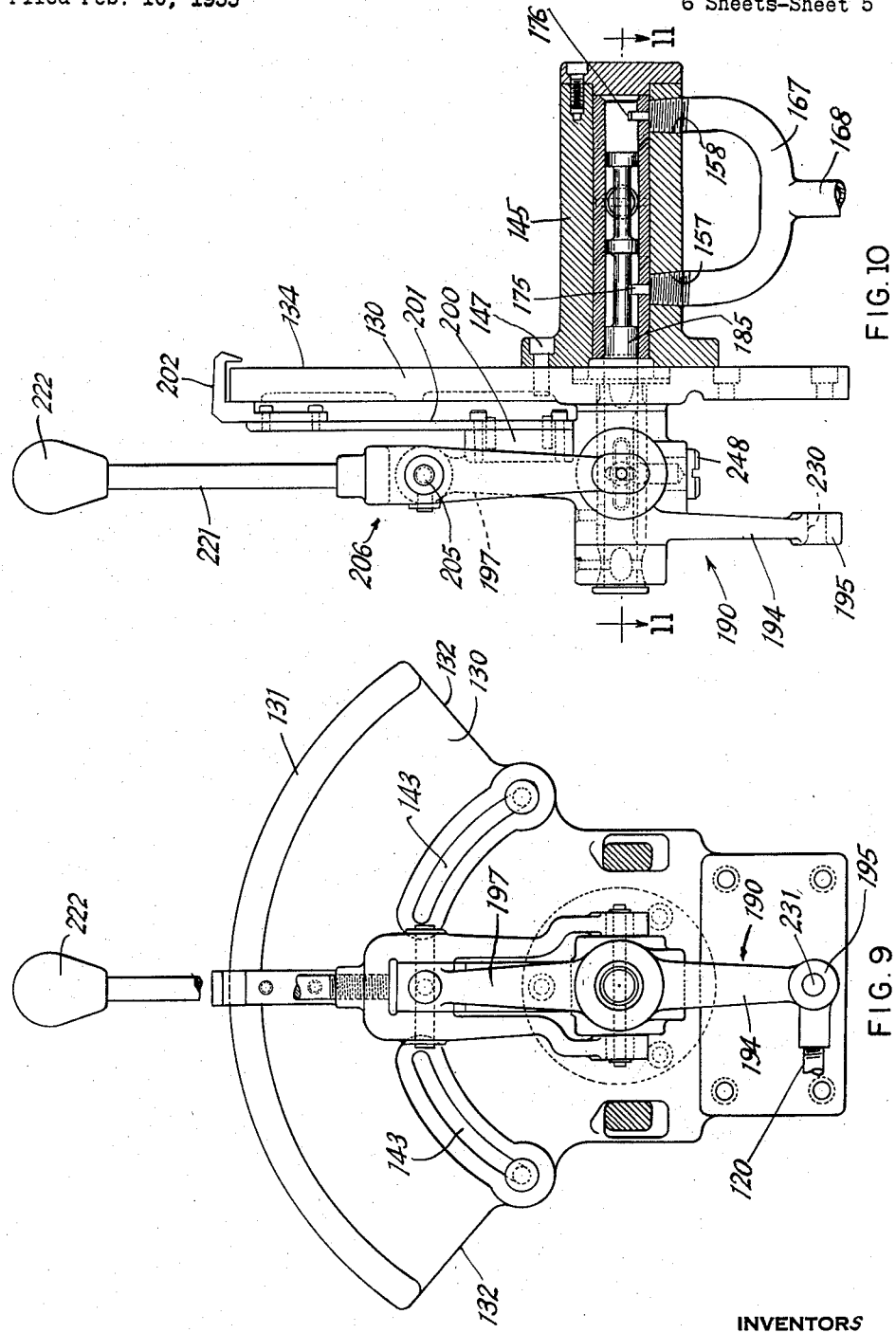
Fig. 9 is a cross sectional view taken on line 9—9 of Fig. 1.
Fig. 10 is a partial cross sectional view taken on line 10—10 of Fig. 9.

It will be noted that the end wall 65 is formed with a cylindrical flange 65a projecting into the cylindrical casing 17. Disposed with said flange 65a and interposed between the ring piston 72 and the clutch 95, is an annular ring 90. Within the outer ring 90 is an inner ring 91 (see Fig. 6), formed at its periphery with outwardly opening, radial notches 92, each having opposed, spaced cylindrical inner surfaces. Within each notch is a roller 93 having a radial axis. The diameter of each roller 93 is greater than the thicknesses of the rings 90, 91 so that said rollers project beyond opposite surfaces of said rings and act as thrust members between the piston and the clutch. The clutch 95 is formed by the clutch discs 88, 89, etc. It will now be understood that when a liquid medium is pumped under pressure into passage 70, the piston ring 72 will move to the right to actuate said clutch 95 to thereby connect the shaft 82 for rotation with the planet carrier 44. Thus, when liquid is pumped to the opening 71 in passage 70, the drive shaft 82 is connected directly to the output shaft 37 so that said output shaft is in the high speed range. Of course, at this time, the brake clutch 20a has not been actuated. However, should pressure be relieved from passage 70, and pressure applied to the passage 34, the brake clutch 20a will be actuated for stopping the rotation of the ring gear 46. In such condition, rotation of the shaft 82 will cause the pinions 55 to rotate around the ring gear, thereby turning the planet carrier slowly and placing the shaft 37 in low speed range.

Extending from the casing 77 and communicating therewith, is a casing portion 100. The axis of the casing portion 100 is at right angles to the casing portion 77 and is spaced therebelow (see Fig. 5). One end of the casing portion 100 is closed by a cover 101. Within said casing portion 100 are a pair of spaced co-axial ball-bearings 102, 103, supporting a transverse shaft 104. The latter carries a worm 105. Worm 105 meshes with a worm wheel 106 keyed to the drive shaft 83. Shaft 104 is connected by a coupling member 107 to a shaft 108 which is rotated by a hydraulic motor 109 of any suitable construction.

The hydraulic motor 109 has two inlets 110 and 111. Connected to the inlet 111 is a conduit or pipe 112. The latter is connected at its other end to one side 113 of a pump 114. The other inlet 110 is connected by conduit or pipe 115 to the other side 116 of said pump 114. The pump 114 is a hydraulic pump and it is rotated by an electric motor 117. The pump 114 is controlled by a valve 118. When a valve 118 is rotated in one direction, it will pump fluid through the conduit 112 to the hydraulic motor 109 for rotating the shaft 108 in one direction, which we may call the forward direction. The degree of rotation of the valve 118 will control the speed of rotation of hydraulic pump 109 in said forward direction. When the valve 118 is rotated in an opposite direction, it will pump fluid through the conduit 115 to rotate the pump 109 in a reverse direction. The degree of rotation of the valve 118 in said opposite direction will control the speed of rotation of the pump 109 in said reverse direction. Thus, the direction of rotation of the drive shaft 82 and speed of rotation is controlled by the direction and degree of rotation of the valve 118. Said valve 118 is rotated by a rod 120.

Means is provided to control the direction and extent of rotation of the valve 118, and also to control the feed of fluid either to passage 34 or 70, by the manipulation of a single handle. Thus, with one handle the operator can cause the screw 12 to be rotated either forward at varying speed in high speed range, in reverse at varying speed in high speed range, forward at varying speed in low speed range, in reverse at varying speed in low speed range, and can cause the screw to idle. To this end, there is attached to the frame 11 of the machine, and on one side thereof, in any suitable manner, a plate 130 (see Figs. 1, 2, 9 and 10). Plate 130 has a part circular upper edge 131 and downwardly and inwardly converging side edges 132. It has a front face 134 formed with a circular recess 135. The recessed wall is formed with a through opening 136. Said plate or member 130 is formed with a rearwardly extending strap portion 137 having side arms 138 interconnected by a front web 140. The web 140 is formed with a through opening 141 horizontally aligned with the opening 136. On the rear face of plate 130 are a pair of symmetrical arcuate grooves 143 for the purpose hereinafter described. Fixed to the front surface 134 of plate 130 is a valve sleeve 145 co-axial with the openings 136, 141. The sleeve 145 may have a flange 146 screwed to plate 130 as by screws 147. Said sleeve 145 may have a hub 148 received in said recess 135. The outer end of the sleeve 145 may be closed by a cover 149 screwed in place by the screws or studs 150. Said sleeve 145 is formed with a through passage 151 co-axial with the openings 136 and 141. On one side of the sleeve is an internally screw-threaded centrally located opening 154, and on the opposite side of the sleeve are a pair of spaced internally screw-threaded openings 155, 156 disposed on opposite sides of opening 154. At the bottom of the sleeve 145 are a pair of screw-threaded openings 157, 158 spaced outwardly of openings 155, 156. Opening 155 is connected by conduit 160 to the opening 71 of the planetary feed box 16. Opening 156 is connected by conduit 161 to the opening 35 of the planetary feed box.

The electric motor 117 (see Figs. 1 and 2) operates the hydraulic pump 164. The pump 164 is connected by a conduit 165 to the tank 166. The openings 157, 158 are inter-connected by a conduit 167, which in turn is connected by a conduit 168 to the tank 166. The feed outlet of the pump 164 is connected by the conduit or pipe 169 to feed opening 154 of the sleeve 145.

Within the sleeve 145 is a fixed inner sleeve 170 provided with a transverse slot 171 communicating with the conduit 169. It is also formed with a pair of transverse slots 173 and 174 communicating with the conduits 160 and 161, respectively. It is furthermore formed with transverse slots 175 and 176 communicating with the return openings 157 and 158 respectively (and hence with conduit 167). It will be noted that the sleeve 170 is non-slidably and non-rotatably fixed within the sleeve 145 in any suitable manner.

One end of sleeve 145 may be formed with a recess 177 to receive a packing gland 178 disposed at one end of the sleeve 170.

Within openings 136, 141 is a sleeve 180 formed with a through opening 181 of the same diameter and co-axial with the through opening 182 in the sleeve 170. Sleeve 180 is formed at opposite sides thereof with longitudinal slots 182 for the purpose hereinafter appearing. Slidably and rotatably mounted within sleeves 170, 180, is a piston valve 185 which passes through gland 178. Said piston valve 185 is formed adjacent one end with an annular groove 186 communicating with the slot 171 in the position of the valve shown in Fig. 11. In such position the supply of hydraulic pressure is cut off from the slots 173 or 174. It will be noted that the right end of the piston 185 terminates short of the slot 174 when the piston is in the position shown in Fig. 11, so that the cylindrical piston portion 187 prevents liquid under pressure entering the groove 186 from passing to slot 174. The piston 185 is formed with another cylindrical groove 188 forming a cylindrical piston portion 189 between the grooves 188 and 186. The piston portion 189 prevents liquid under pressure from passing to the slot 173 when the piston is in position of Fig. 11. It will be noted that in the position of Fig. 11, the return opening 158 communicates through the interior of the sleeve 170 with the slot 174, and return opening 157 communicates through the groove 188 with the slot 173. Thus, in the position of Fig. 11 there is no liquid under pressure to either of the clutches 21a or 95 in the planetary feed box 16. This is the idle position of the machine. In this position the hydraulic motor 109 can operate without effecting the screw 12. Also in this position the screw 12 can be turned by hand.

Means is provided for shifting the piston valve 185 either to the right or to the left. To this end there is rotatably and non-slidably mounted on the sleeve 180 and between the member 130 and the web 140, of the strap 137, a member 190. Said member 190 comprises a central sleeve portion 191 which rotatably engages the sleeve 180 and is formed with a through opening or bore to receive said sleeve. Said portion 190 is formed on opposite sides thereof with longitudinal slots 192 registering with the slots 182 of the sleeve 180. Extending downwardly from the forward end of the sleeve portion 191 is an arm 194 formed with an apertured hub 195 at its lower end.

Extending upwardly from the rear end of the sleeve 191 is an arm 197 formed with a transverse through opening 198 at its upper end. Attached to the rear side of the arm 197 is a plate 200 to which is attached an upwardly extending bar 201. Fixed to the bar 201 is a pointer 202 which passes around the upper edge 131 of the plate 130. Mounted in the transverse opening 198 is a cross pin 205. Pivoted to the cross pin is a rocker 206. Said rocker comprises a top web portion 207 from which extend downwardly arms 208 forming a yoke. The arms 208 are formed with through openings 209 to receive the ends of the cross pin 205. The arms 208 straddle the sleeve portion 191. At the lower ends of the arms 208 are formed slots 210. The piston 186 is formed with a transverse through opening 214. Passing through the opening 214 and through the registering slots 182, 192, is a transverse pin 217. The ends of the pin 217 pass through the slots 210 in the arms 208.

The transverse top or web portion 207 of the rocker 206 is formed with a vertical threaded through opening 220. Fixed within said opening is the lower end of a rod 221 provided with a handle or knob 222 at its upper end. The lower end of the rod is screwed into the opening 220. It will now be understood that the handle 222 may be grasped and pivoted in a counter-clockwise direction, looking at Fig. 11, to establish communication between the feed conduit 169 and the conduit 161, thereby allowing liquid medium under pressure to pass to the passage 34 to actuate the brake clutch 20a, thereby causing the output shaft 37 to rotate in low speed zone as explained hereinabove. At this time, communication is cut off between the slot 174 and the return opening 158.

In such position, furthermore, slot 173 is still in communication with the return opening 157 so that there is no pressure in the conduit 160 and clutch 95 is in unclutched condition.

When the handle 222 is now grasped and swung in a clockwise direction, the piston valve 185 is shifted to the left, looking at Fig. 11, of the drawing. In such position, slot 171 communicates with the slot 173 through the groove 186 and fluid under pressure is passed from the feed conduit 169 to the conduit 160 and hence to passage 70 for actuating the clutch 95, thereby directly connecting the drive shaft 83 with the output shaft 37. The screw 12 is then in high speed range. At such time, the slot 174 is in communication with the return opening 158 and hence there is no pressure with brake clutch 20a. Furthermore, at such time communication is closed between the slot 173 and the return opening 157. It has thus been demonstrated that movement of the handle forward or rearward controls placing the output shaft and hence the screw in high speed range or low speed range or in idling condition.

The hub 196 at the lower end of arm 194 is formed with a longitudinal through opening 230. Extending through the opening 230 is pin 231. Connected to the pin 231 is the rod 120 which is connected to the valve 118. It will be noted that in any angular position of the handle 221 about the axis of the pin 205, said handle, together with yoke 206, together with member 190, may be rotated about the axis of the piston 183 to thereby move the rod 120 either to the right or to the left and thereby rotating the valve 118 either clockwise or counterclockwise. The valve 118 when rotated in one direction will cause fluid to pass from pump 114 through conduit 112 to operate the motor 109 in one direction and when the valve is rotated in opposite direction by the rod 120, fluid will be pumped by pump 113 and through the conduit 115 to operate the hydraulic motor 109 in an opposite direction. The degree of angular movement of the valve 118 is dictated by the degree of angular movement of the handle 221 about axis of the valve 185, and the degree of rotation of the valve 118 controls the speed of rotation of the pump 109. Thus, both the direction of rotation of the shaft 112 and the degree of rotation thereof within the high speed zone or the low speed zone is controlled by the degree of movement of the handle 221 either to the right or to the left, looking at Fig. 9, and the speed of rotation within each zone is dependent upon the degree of angular movement of said handle. Also, this movement of the handle 221 either to the right or to the left can be accomplished no matter in what position the handle may be about the axis of pin 204. Thus, an operator by moving the single handle can control the direction of movement and the speed of movement of the table within the high speed range or low speed range, and also the operation of this handle can place the machine in idle condition. It will be noted that when the electric motor 117 is shut off and the pump 109 is not operating, the output shaft is locked against rotation and the worm wheel 106 can act as a brake to stop momentum of the table which may run on roller bearings. Thus, the table may be braked either when it is in high speed zone or in low speed zone by shutting off the drive. This action is the result of the use of worm gear which is non-reversible at the drive.

A separate hand wheel may be provided for turning the screw 12 by hand when the machine is in idle condition. When the device is in low speed range and the clutch 20a is actuated to stop the ring gear 56 from rotating, stopping of the drive will prevent movement of the drive shaft 83, which prevents the pinions 55 from rotating so that the driven shaft 37 cannot move for the very reason that the planet carrier 44 cannot move. Also, in high speed range, when the clutch 44 is actuated, stopping of the drive motor will prevent the output shaft 37 from rotating because it is directly connected to the drive shaft 83.

Although the drive shaft is shown by means of a hydraulic motor, it would be possible to drive the drive shaft directly by means of an electric motor within purview of this invention.

Spring pressed means may be provided to retain the piston valve 185 in its three positions, that is neutral or idle, high speed position and low speed position. To this end sleeve 191 is formed at its underside with a vertical through opening 240 communicating with the interior of the sleeve. The lower end of the opening 240 is formed with internal screw-threads 241. The sleeve 180 is formed with a through opening 242 registered with the opening 240. The piston valve 185 is formed at its underside with three longitudinally spaced openings 247. Screwed within the opening 240 is a hollow plug 248. Within the hollow of the plug is a coil compression spring 249 pressing a ball 250 through the opening 242 in the sleeve 180, and into one of the three openings 247. This spring pressed ball 250 will click into one of these three openings 247 to retain the piston either at its high speed position, low speed position, or neutral position.

As possible embodiments might be made of the above invention, and as various changes might be made in the embodiment set forth above, it is to be understood that all matter herein set forth or shown in the accompanying drawings, is to be interpreted as illustrative and not in a limiting sense.

We claim:

1. In combination, a drive shaft, a driven shaft, means to drive the drive shaft in forward and reverse and at different speeds in forward and in reverse, means to cause the driven shaft to be driven in high speed range and in low speed range when the drive shaft is rotated either in forward or in reverse and at different speeds, a single manually actuated member and means controlled by the movement of said member to control the means for driving the drive shaft forward, reverse and at different speeds, and also to control the means for driving the driven shaft in high speed range and in low speed range when the drive shaft is rotated in either forward or reverse and at varying speeds, means controlled by said member for placing the driven shaft in idle condition, and means for braking the movement of said driven shaft upon stopping rotation of the drive shaft, when the driven shaft is in either high speed range or low speed range.

2. In combination, a drive shaft, a fixed casing, a planet carrier in the casing co-axial with the drive shaft, a clutch in the casing interposed between the drive member and said plant carrier, a driven shaft on said planet carrier co-axial with the drive shaft pinions carried by the planet carrier, sun gear means on said drive shaft meshing with said pinions, a ring gear in the casing meshing with said pinions, a brake in the casing interposed between said ring gear and said casing, a handle, means for mounting the handle for movement about one axis, hydraulically actuated means controlled by movement of said handle about said axis, in one direction, for actuating the clutch and releasing the brake, whereby to connect the drive shaft directly to the driven shaft, and hydraulically actuated means controlled by movement of said handle about said axis in an opposite direction for releasing the clutch and actuating the brake for driving the driven shaft at a speed less than that of the drive shaft, hydraulic pump means for rotating the drive shaft, means for mounting said handle for rotation about an axis perpendicular to and spaced from the first axis, and means controlled by movement of said handle about the second axis for changing the speed of rotation of the hydraulic pump means and for changing the direction of rotation of said pump means.

3. In combination, a planetary feed box comprising a casing, a drive shaft therein, a driven shaft therein and extending therefrom, a planet carrier within said feed casing and fixed relative to said driven shaft, a clutch interposed between said planet carrier and the drive shaft, pinions on said planet carrier, sun gear means on the drive shaft meshing with said pinions, a ring gear meshing with said pinions, a brake interposed between the ring gear and the casing, hydraulic actuated means to actuate the clutch, hydraulic actuated means to actuate the brake, an electric motor, a pump operated by said motor, conduit means to connect the pump to a return tank, a fixed sleeve having a feed inlet opening, a first clutch opening, and a brake opening, and a pair of return openings, conduit means to connect the return openings to the tank, conduit means to connect the pressure outlet end of the pump to the feed opening of said sleeve, conduit means to connect the clutch opening to the hydraulic actuated means for actuating the clutch in the planetary feed box, conduit means to connect the brake opening to the hydraulic actuated means for actuating the brake in the planetary feed box, a piston slidably mounted in said sleeve, said piston having means, in one position thereof, to connect said clutch and brake openings with the return openings in said sleeve and to block communication between the feed opening and said clutch and brake openings, said piston being shiftable to a first shifted position, and having means in said first shifted position to establish communication between the feed opening and the brake opening and to cut off communication between the brake opening and one of the return openings, while blocking communication between the feed opening and the first clutch opening, and maintaining communication between the first clutch opening and one of the return openings, and said piston being shiftable to a second shifted position and having means in said second shifted position to establish communication between the feed opening and the clutch opening while cutting off communication between the clutch opening and the return openings, and maintaining communication between the brake opening and one of the return openings.

4. The combination of claim 3, in combination with a non-slidable member, a handle mounted for rotation on said member about an axis perpendicular to and spaced from the axis of said piston, means to pivotally connect an arm of said handle to the piston about an axis perpendicular to the axis of said piston, whereby movement of the handle will cause shifting movement of said piston.

5. The combination with claim 4, said member being rotatable about the axis of said piston, an arm on said member, a second pump connected to said electric motor, a hydraulic motor for driving said drive shaft, means on a second pump to cause the hydraulic motor to rotate the drive shaft in forward or reverse directions and at various speeds, a valve to control the operation of the second pump and to determine the direction of rotation of the hydraulic motor and the speed of rotation thereof, and means connecting said valve with the arm of said member for controlling the direction of movement, and degree of movement of said valve when said member is rotated about the axis of said piston.

6. In combination, a drive shaft, a driven shaft, a planetary gear system interconnecting said shafts, said system comprising means including a transmission, a first hydraulic actuated means controlling said transmission for connecting the driven shaft directly to the drive shaft when said first hydraulic actuated means is actuated, and a second hydraulic actuated means controlling said transmission to cause the driven shaft to be driven at a lesser speed than the drive shaft when said second hydraulic actuated means is actuated, a fixed sleeve, a valve piston slidable in said sleeve, said sleeve being formed with a hydraulic feed inlet opening, with return openings, with an outlet opening connected by a conduit to the first hydraulic actuated means and with an outlet opening connected by a conduit to the second hydraulic actuated means, a member non-slidably mounted relative to the sleeve, a handle member pivoted to said non-slidable member about an axis perpendicular to and spaced from the axis of said piston, said handle member being pivotally connected to said piston for shifting said piston upon rotating said handle about its pivot, said piston having means to selectively connect the inlet opening with said outlet openings and to selectively connect said outlet openings with said return openings, said non-slidable member being rotatable about the axis of said piston, in combination with an arm on said rotatable and non-slidable member, means to drive the drive member, and means including a member connected to said arm, for controlling the means for driving the drive member.

7. In combination, a drive shaft, a driven shaft, a first means to cause the driven shaft to be rotated in one speed range upon rotating the drive shaft, a second means to cause the driven shaft to be rotated in a second speed range upon rotating the drive shaft, a manually operated member, means to mount said member for rotation about one axis in opposite directions, hydraulic actuated means to actuate the first means upon rotating said member in one direction, hydraulic actuated means to actuate said second means upon rotating said member in an opposite direction, and hydraulic actuated means controlled by said manually operated member to vary the speed of rotation of said drive shaft, said means to vary the speed of said drive shaft including means to rotate said drive shaft in forward and reverse, means to mount said member for rotation about an axis perpendicular to and spaced from its first pivotal axis, and means controlled by rotation of said member about its second pivotal axis in any angular position thereof about its first axis for controlling the means for driving said drive member in forward and reverse, when the driven shaft is in either of its speed ranges.

8. The combination of claim 7, said means for driving the drive member including means to brake the driven member upon stopping rotation of said drive member, when said driven member is in either of its speed ranges.

9. In combination, a drive shaft, a driven shaft, hydraulically actuated means to drive the drive shaft in forward and reverse and at different speeds in forward and in reverse, hydraulically actuated means to cause the driven shaft to be driven in high speed range and in low speed range when the drive shaft is rotated either in forward or in reverse and at different speeds, a single manually actuated member and means controlled by the movement of said member to control the means for driving the drive shaft forward, reverse and at different speeds, and also to control the means for driving the driven shaft in high speed range and in low speed range when the drive shaft is rotated in either forward or reverse and at varying speeds.

10. The combination of claim 9, in combination with hydraulically actuated means controlled by said member for placing the driven shaft in idle condition.

References Cited in the file of this patent

UNITED STATES PATENTS

| | | |
|---|---|---|
| 2,073,045 | Bachman | Mar. 9, 1937 |
| 2,151,714 | Pavesi | Mar. 28, 1939 |
| 2,499,152 | Morgan | Feb. 28, 1950 |
| 2,582,895 | Young | Jan. 15, 1952 |
| 2,703,500 | Roche | Mar. 8, 1955 |
| 2,749,772 | O'Malley | June 12, 1956 |